(12) United States Patent
Shenaq et al.

(10) Patent No.: US 10,457,104 B2
(45) Date of Patent: Oct. 29, 2019

(54) TOW LOOP POSITIONING SYSTEMS AND METHOD

(71) Applicant: Ford Global Technologies, LLC, Dearborn, MI (US)

(72) Inventors: Mohammed Shenaq, Dearborn, MI (US); Sudip Bhattacharjee, Novi, MI (US); Mustafa Ahmed, Canton, MI (US); Ray Hari Manala Rethinam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 15/872,023

(22) Filed: Jan. 16, 2018

(65) Prior Publication Data

US 2019/0217673 A1 Jul. 18, 2019

(51) Int. Cl.
| | |
|---|---|
| *B60D 1/167* | (2006.01) |
| *B60D 1/50* | (2006.01) |
| *B60D 1/54* | (2006.01) |
| *B60D 1/56* | (2006.01) |

(52) U.S. Cl.
CPC ............. *B60D 1/1675* (2013.01); *B60D 1/50* (2013.01); *B60D 1/54* (2013.01); *B60D 1/565* (2013.01)

(58) Field of Classification Search
CPC .................................. B60D 1/488; B60D 1/50
See application file for complete search history.

(56) References Cited

U.S. PATENT DOCUMENTS

| | | | | |
|---|---|---|---|---|
| 6,382,654 | B1 * | 5/2002 | Mahncke | B60D 1/488 280/491.1 |
| 6,893,063 | B2 * | 5/2005 | Harrison | B60D 1/485 293/117 |
| 7,137,658 | B2 * | 11/2006 | Haneda | B60D 1/56 293/117 |
| 7,290,783 | B2 * | 11/2007 | Dornbos | B60D 1/143 280/486 |
| 7,758,060 | B2 * | 7/2010 | Lopez | B60D 1/488 280/495 |
| 7,775,546 | B2 * | 8/2010 | Asjad | B60D 1/488 280/498 |
| 8,328,223 | B2 * | 12/2012 | Leinenger | B60D 1/04 280/416.1 |

(Continued)

FOREIGN PATENT DOCUMENTS

| | | |
|---|---|---|
| CN | 202345319 | 7/2012 |
| CN | 205930075 | 2/2017 |

(Continued)

*Primary Examiner* — Kevin Hurley
(74) *Attorney, Agent, or Firm* — Carlson, Gaskey & Olds, P.C.

(57) ABSTRACT

An exemplary towing assembly includes, among other things, a bracket having laterally spaced channels, and a tow loop having laterally spaced arms. Each of the arms is configured to slide within a respective one of the channels from a deployed to a retracted position in response to a load applied to the tow loop. An exemplary method of positioning a tow loop includes, among other things, in response to a load applied to a tow loop, moving the tow loop from a deployed position to a retracted position within a bracket. The method further includes biasing the tow loop away from the retracted position toward a deployed position.

19 Claims, 5 Drawing Sheets

(56) References Cited

U.S. PATENT DOCUMENTS

| 8,371,602 | B1 * | 2/2013 | Peschansky | B60D 1/04 |
| | | | | 280/446.1 |
| 8,590,950 | B2 * | 11/2013 | Hermanson | B60D 1/565 |
| | | | | 293/102 |
| 8,678,423 | B1 * | 3/2014 | Hwang | B60R 19/34 |
| | | | | 280/495 |
| 9,114,679 | B2 * | 8/2015 | Hood | B60D 1/14 |
| 10,131,193 | B2 * | 11/2018 | Degenkolb | B60D 1/488 |
| 2019/0084361 | A1 * | 3/2019 | Ghannam | B60D 1/143 |

FOREIGN PATENT DOCUMENTS

| DE | 102018001611 A1 * | 8/2018 | B60D 1/565 |
| EP | 2248688 | 11/2010 | |
| FR | 2776240 | 9/1999 | |
| JP | 2003002136 A * | 1/2003 | B60D 1/243 |

* cited by examiner

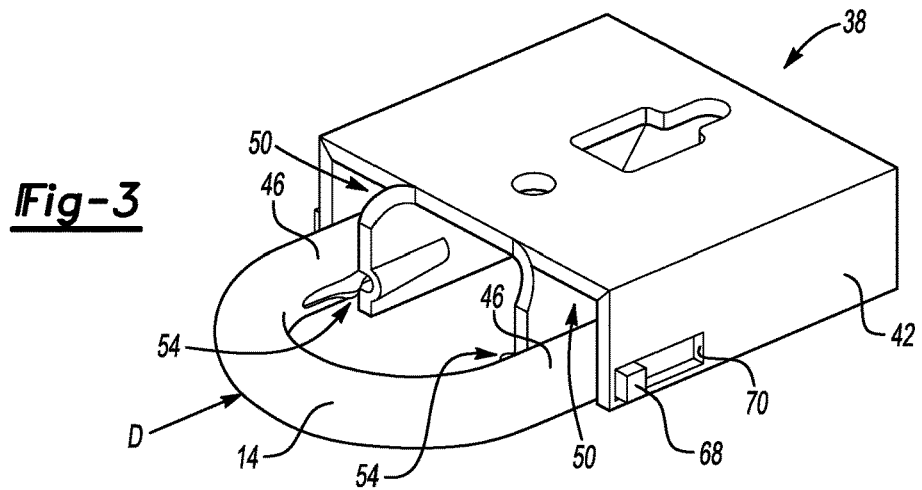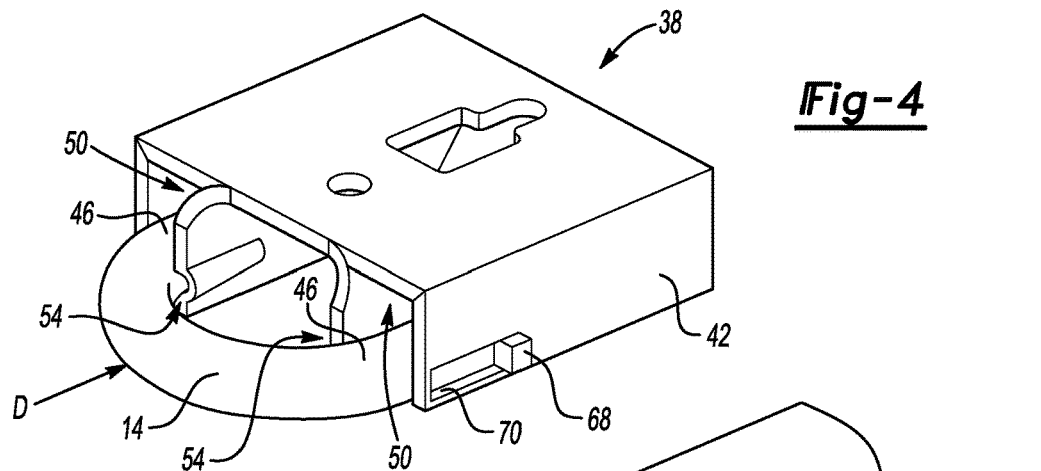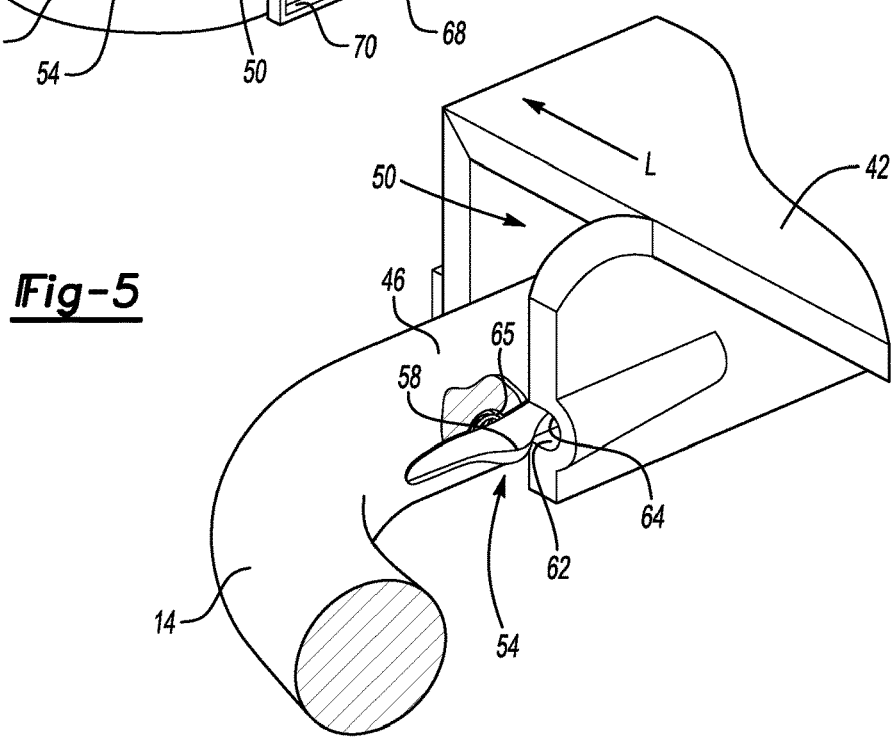

TOW LOOP POSITIONING SYSTEMS AND METHOD

TECHNICAL FIELD

This disclosure relates generally to a tow loop and, more particularly, to a tow loop that retracts from a deployed position in response to a load.

BACKGROUND

Many vehicles include tow loops. The vehicles can use the tow loops for towing. The vehicles can also utilize the tow loops when being towed. Tow loops can be included in the front, the rear, or some other area of the vehicle.

SUMMARY

A towing assembly, according to an exemplary aspect of the present disclosure includes, among other things, a bracket having laterally spaced channels, and a tow loop having laterally spaced arms. Each of the arms is configured to slide within a respective one of the channels from a deployed to a retracted position in response to a load applied to the tow loop.

In another exemplary embodiment of the foregoing assembly, the tow loop is biased away from the retracted position toward the deployed position.

Another exemplary embodiment of any of the foregoing assemblies includes a biasing structure configured to bias the tow loop away from the retracted position toward the deployed position.

In another exemplary embodiment of the foregoing assembly, the biasing structure comprises a protrusion that is received within a slot as the tow loop moves from the deployed to the retracted position.

In another exemplary embodiment of the foregoing assembly, the biasing structure comprises at least one ball bearing received within a slot on a wall of one of the channels as the tow loop moves from the deployed to the retracted position.

Another exemplary embodiment of any of the foregoing assemblies includes at least one polymer-based shock absorber configured to bias the tow loop toward the deployed position.

In another exemplary embodiment of any of the foregoing assemblies, the at least one polymer-based shock absorber includes a polymer-based absorber disposed within each of the channels.

In another exemplary embodiment of any of the foregoing assemblies, the biasing structure comprises a tension slide clip received within a groove as one of the arms is moved from the deployed to the retracted position.

In another exemplary embodiment of any of the foregoing assemblies, the groove is tapered such that the tension slide clip compresses as one of the arms is moved from the deployed to the retracted position.

In another exemplary embodiment of any of the foregoing assemblies, the tow loop has a U-shape.

Another exemplary embodiment of any of the foregoing assemblies includes a coupling arrangement that limits movement of the tow loop to prevent the arms from fully withdrawing from the channels such that the tow loop and the bracket remain coupled when towing a vehicle utilizing the tow loop.

In another exemplary embodiment of any of the foregoing assemblies, the coupling arrangement comprises an extension of one of the tow loop or the bracket received within an aperture in the other of the tow loop or the bracket.

In another exemplary embodiment of any of the foregoing assemblies, the tow loop is a U-bar, and the assembly further includes a biasing structure associated with each of the arms of the U-bar. The biasing structure is configured to bias the tow loop away from the retracted position toward the deployed position.

A method of positioning a tow loop according to another exemplary aspect of the present disclosure includes, among other things, in response to a load applied to a tow loop, moving the tow loop from a deployed position to a retracted position within a bracket. The method further includes biasing the tow loop away from the retracted position toward a deployed position.

Another exemplary embodiment of any of the foregoing methods includes slideably receiving a protrusion within a channel as the tow loop slides to the retracted position.

Another exemplary embodiment of any of the foregoing methods includes biasing utilizing a polymer-based shock absorber.

In another exemplary embodiment of any of the foregoing methods, the polymer-based shock absorber is disposed within channels that receive arms of the tow loop.

Another exemplary embodiment of any of the foregoing methods includes biasing by deforming a slide clip as the tow loop moves to the retracted position.

In another exemplary embodiment of any of the foregoing methods, the tow loop is a U-bar, and the method further includes biasing the tow loop away from the retracted position toward the deployed position using a biasing structure associated with each of the arms of the U-bar.

Another exemplary embodiment of any of the foregoing methods includes biasing by using at least one ball bearing received within a slot on a wall of one of the channels as the tow loop moves from the deployed to the retracted position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows:

FIG. 3 illustrates an exemplary embodiment of a tow loop system having the tow loop of FIG. 2 in a deployed position.

FIG. 4 illustrates the tow loop system of FIG. 3 having the tow loop in a retracted position.

FIG. 5 illustrates a close-up view of a biasing structure within the tow loop system of FIGS. 3 and 4.

DETAILED DESCRIPTION

This disclosure details a tow loop positioning system. In some examples, a tow loop of the tow loop system can absorb loads by moving from a deployed position to a retracted position. The tow loop system thus incorporates energy management features.

While moveable to the retracted position, the tow loop is biased toward the deployed position. The biasing causes the tow loop to return to the deployed position from the retracted position. A user thus does not need to manually adjust the tow loop back to the deployed position.

Figure 1:
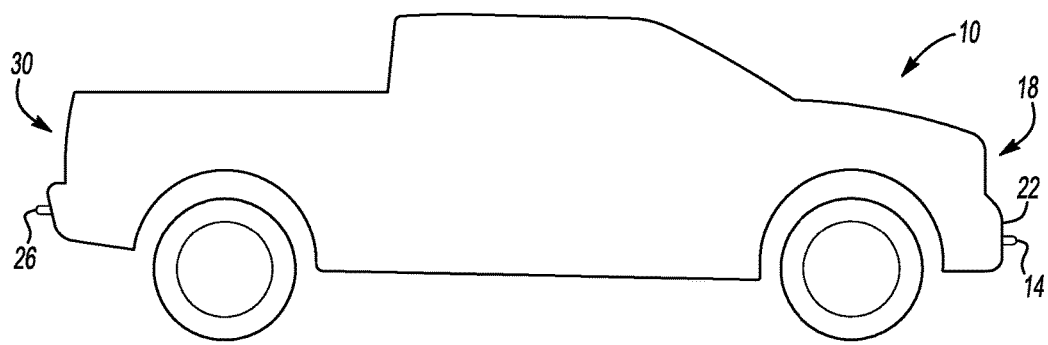
FIG. 1 illustrates an exemplary vehicle having tow loops.
Figure 2:
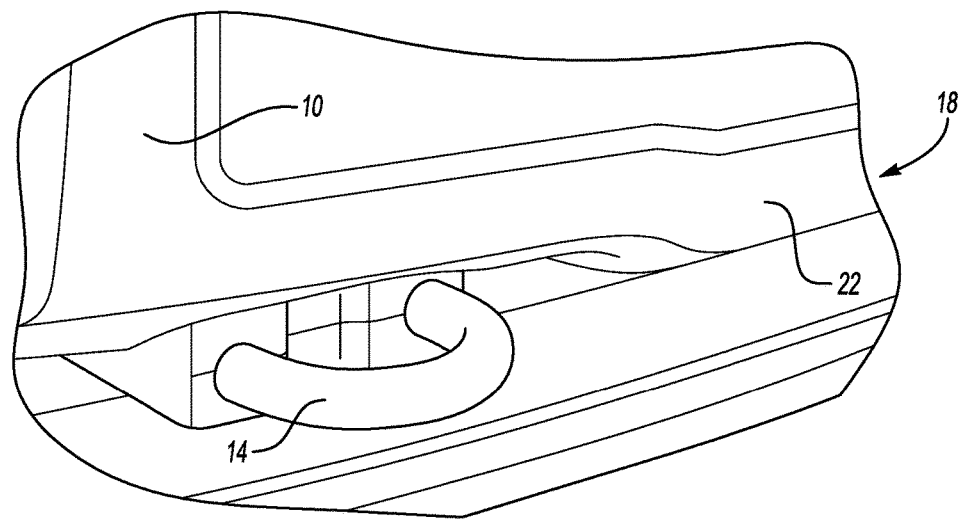
FIG. 2 illustrates a close-up view of one of the tow loops from the vehicle of FIG. 1.

Referring now to FIGS. 1 and 2, an exemplary vehicle 10 includes a tow loop 14 at a front 18 of the vehicle 10. The tow loop 14 is shown in a deployed position.

In the deployed position, a rope, cable, etc. can connect to the tow loop 14 to couple the vehicle 10 to another vehicle (not shown). The other vehicle can then tow the vehicle 10. The vehicle 10 could alternatively tow the other vehicle, or tow something else. The example vehicle 10 includes two tow loops 14 at the front 18.

The tow loop 14 projects forward from the surrounding areas of the vehicle 10, here a bumper 22. Accordingly, when the vehicle 10 is moving forward, the tow loop 14 could be the first area of the vehicle 10 to contact an obstacle in a path of the vehicle 10. Managing energy transfer between the object and the tow loop 14 can be desirable. For example, reducing the load exerted on the obstacle by the tow loop 14 can be desirable in some situations to reduce damage to the obstacle. If the obstacle is a pedestrian, an injury risk can be reduced if the load is reduced.

One or more additional tow loops 26 could be positioned at a rear 30 of the vehicle 10, or in some other area. The tow loops 26 project rearward from the vehicle 10. The tow loops 26, like the tow loops 14, can be used for towing the vehicle 10, or for towing something else with the vehicle 10. The tow loops 26, when the vehicle 10 is moving in reverse, could be the first area of the vehicle 10 to contact an obstacle in a path of the vehicle 10. Reducing the point load exerted on the obstacle by the tow loop 26 can be desirable in some situations.

Referring now to FIGS. 3 and 4, the tow loop 14 is part of a towing assembly 38 that includes the tow loop 14 and a bracket 42. The tow loop 14, in this example, is a U-bar, or U-shaped bar, having a pair of laterally spaced apart arms 46. The arms 46 are disposed within respective laterally spaced channels 50 of the bracket 42.

In response to a load applied in a direction D, the tow loop 14 moves from the deployed position of FIG. 3 to the retracted position of FIG. 4. When moving to the retracted position, the arms 46 slide within the channels 50. The movement to the retracted position reduce a load applied by the tow loop 14 to the obstacle contacting the tow loop 14, such as a load applied to a lower leg of a pedestrian.

For purposes of this disclosure, the deployed position is the designed position for the tow loop 14 to tow and the position of the tow loop 14 during normal operation. The retracted position is any position where the tow loop 14 is retracted from the deployed position. That is, the tow loop 14 does not need to be fully retracted to be in a retracted position.

In this example, the towing assembly 38 includes a biasing structure 54 associated with each of the arms 46. The biasing structure 54 is configured to bias the tow loop 14 from the retracted position of FIG. 4 to the deployed position of FIG. 3. Because of the biasing structure 54, a user is not required to exit the vehicle 10 to manually move the tow loop 14 from the retracted position of FIG. 4 to the deployed position of FIG. 3. The biasing structure 54 instead causes the tow loop 14 to automatically pop back out, or rebound, to the deployed position of FIG. 3 after the load is removed.

A force required to move the tow loop 14 from the deployed position of FIG. 3 to the retracted position of FIG. 4 is from one to two kilonewtons. This level of force has been found to facilitate avoiding movement of the tow loop 14 under ordinary operation when the tow loop 14 is not in contact with any object and when movement of the tow loop 14 to the retracted position is not desired.

The exemplary tow loop 14 includes two arms 46 and two biasing structures 54, which can facilitate tuning the tow loop 14 to move from the deployed position to the retracted position in response to a particular load. The two arms 46 and two biasing structures 54 provide for more variability than, for example, a single biasing structure.

Figure 6:
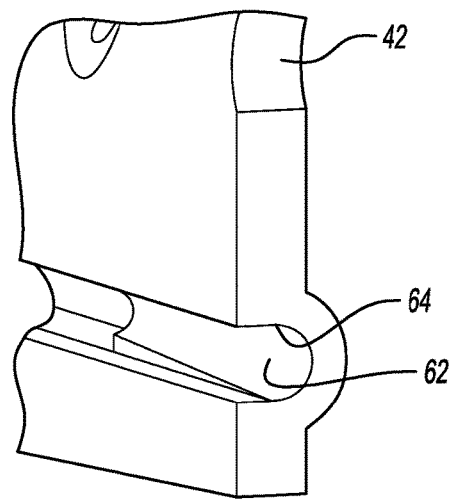
FIG. 6 illustrates a close-up view of a press fit channel within a bracket of the tow loop system of FIGS. 2 and 3.

With reference to FIGS. 5 and 6, the biasing structure 54, in this exemplary embodiment, includes a protrusion 58 from the arm 46 that is received within a slot 62 within a wall of one of the associated channels 50 as the arm 46 slide within the channels 50. The protrusion 58 can be a ramped area of the arms 46. In another example, the slot 62 could be provided on the tow loop 14 and the protrusion 58 is provided on the bracket 42.

Moving rearward from an opening 64 of the slot 62, the slot 62 tapers downward and laterally outward in a direction L. The biasing structure 54 has a corresponding taper.

The biasing structure 54 is biased laterally inward by a biasing member, such as spring 65, for example. The spring 65 can be held within a bore of the arm 46. As the tow loop 14 is moved to the retracted position, the tapering of the slot 62 causes the biasing structure 54 to be compressed laterally outward in direction L relative to other areas of the arm 46. That is, as the tow loop 14 is moved to the retracted position, the protrusion 58 of the biasing structure 54 is press fit within the slot 62, which forces the protrusion 58 to a depressed position.

Figure 7:
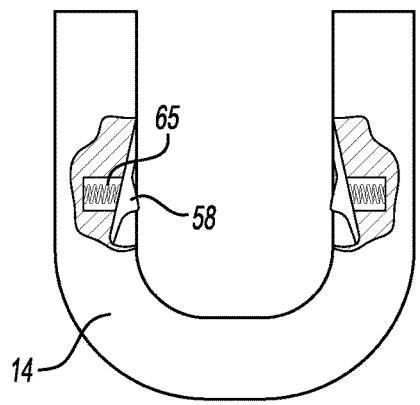
FIG. 7 illustrates a tow loop of the tow loop system of FIGS. 3 and 4 in the retracted position with selected portions removed to reveal biasing structures within the tow loop system.

FIG. 7 shows the tow loop 14 in the retracted position with selected portions cut-away to reveal the protrusions 58 compressed within the respective arms 58. The springs 65 press the protrusions 58 against the ramped walls of the slots 62, which biases the tow loop 14 toward the deployed position of FIG. 3. After removing the load applied in the direction D, or sufficiently reducing the load, the biasing of the springs 65 causes the tow loop 14 to slide back to the deployed position.

Rather than a protrusion 58, a ball bearing could utilized to provide the biasing structure 54 together with a slot. The ball bearing can, for example, be embedded in the tow loop 14 and received within a slot in a wall of one of the channels 50. After movement of the tow loop 14 to the retracted position, the ball bearing exerts a force against the sides of the slots. When the load on the tow-loop is removed, the force, accompanied by the inward bias of the slots, would force the tow loop 14 toward the deployed position.

In yet another example, the biasing structure 54 is an area of the tow loop 14 that is compressible. As the tow loop 14 is moved to the retracted position, the tapering of the slot compresses the area.

In this example, the tow loop 14 is coupled to the bracket 42 via a tower 68 received within an opening 74 of the bracket 42. This is an exemplary type of coupling arrangement that blocks withdrawal of the arms 46 out of the channels 50. When the vehicle 10 of FIG. 1 is towed using the tow loop 14, the tower 68 contacts the bracket 42 to permit withdrawal of the tow loop 14 from the bracket 42. The coupling arrangement could be adjusted as required to accommodate, for example, higher towing loads.

Figure 8:
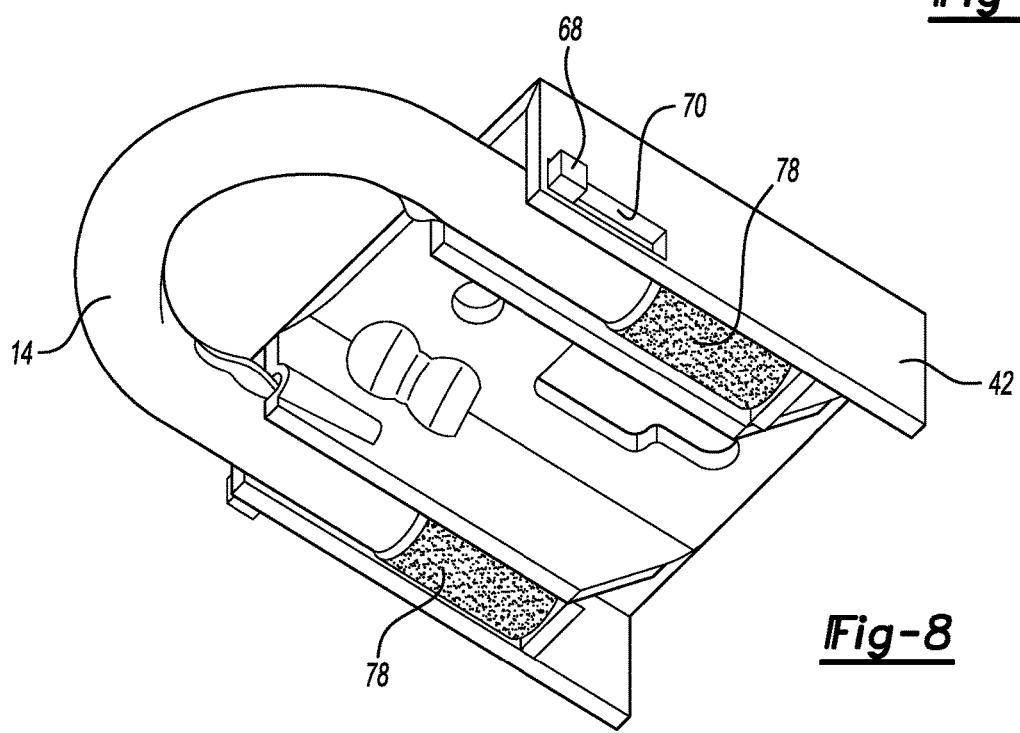
FIG. 8 illustrates a schematic bottom view of the tow loop system of FIGS. 3 and 4 revealing another exemplary biasing structure.
Figure 9:
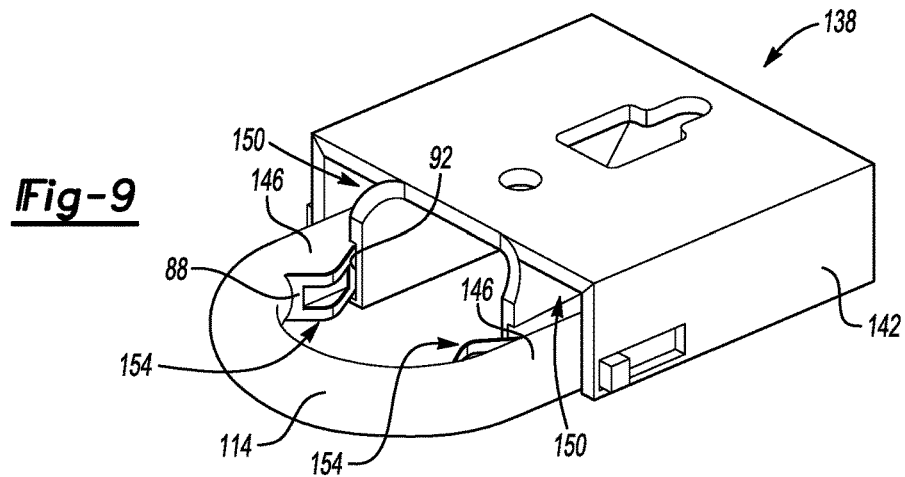
FIG. 9 illustrates a tow loop system according to another exemplary embodiment having a tow loop in a deployed position.
Figure 10:
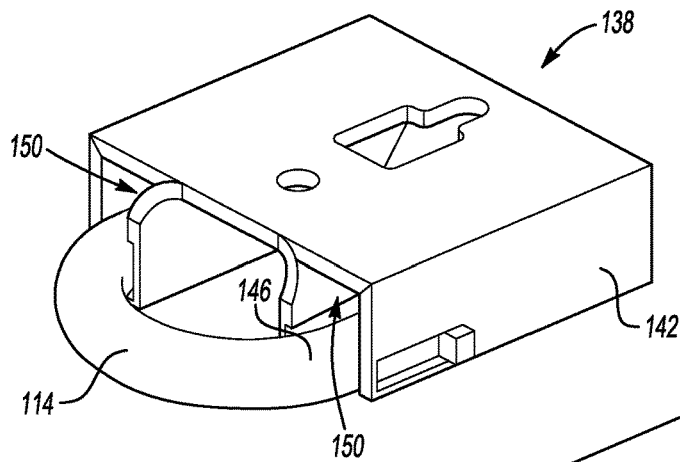
FIG. 10 illustrates the tow loop system of FIG. 8 in a retracted position.
Figure 11:
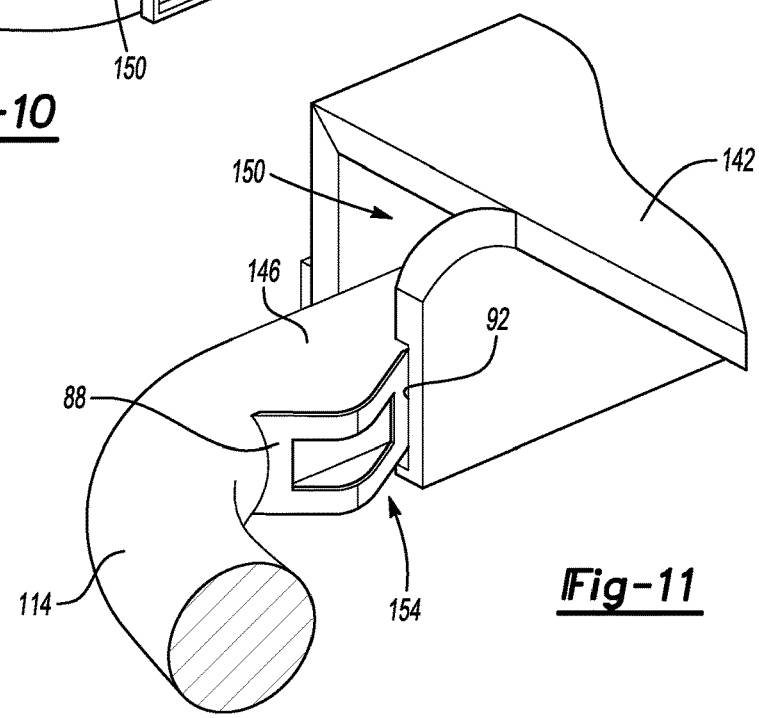
FIG. 11 illustrates a close-up view of a biasing structure within the tow loop system of FIGS. 9 and 10.
Figure 12:
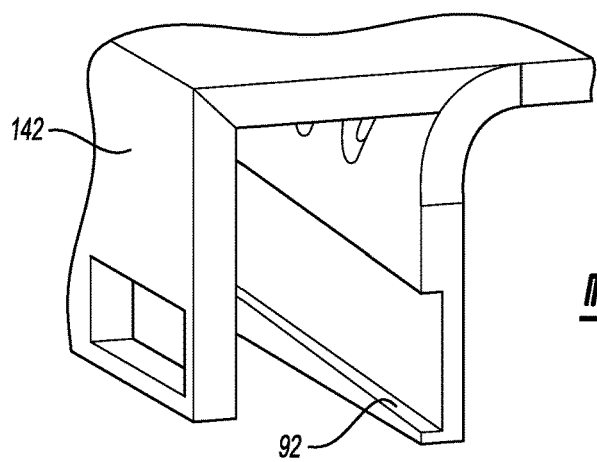
FIG. 12 illustrates a close-up view of a channel within a bracket of the tow loop system of FIGS. 9 and 10.

Referring now to FIG. 8, although not required, the towing assembly 38 could incorporate polymer-based shock absorbers 78. Here, one shock absorber 78 is disposed within each of the channels 50. The shock absorbers 78 are each sandwiched between an end of one of the arms 46 and an aft-most wall of the channels 50. The shock absorbers 78 could be used in connection with the protrusion embodiment of FIGS. 3-7 the ball bearing embodiment, or in connection with another type of biasing structure. In still other examples, the arms 46 include no biasing structure like the protrusion 58, and the biasing structure is instead provided entirely by the shock absorbers. The shock absorbers 78 could be rubber stoppers that compress to absorb the load then recoil to allow tow loop 14 to return to the deployed position.

As the tow loop 14 moves to the retracted position, the shock absorbers 78 are compressed along the longitudinal axis of the channels 50. A designer could select materials to provide a desired rate of compression. In some examples, the compression can be rate dependent. For example, if the tow loop 14 is moved quickly to the retracted position, the shock absorber 78 may be relatively easy to compress. However, if the tow loop 14 is moving more slowly to the retracted position, the shock absorber 78 may be more resistant to movement of the tow loop 14 to the retracted position.

After removing the load from the tow loop 14, the shock absorbers 66 expand and help to urge the tow loop 14 back to the deployed position of FIG. 3. That is, the shock absorbers 66 can also help to bias the tow loop 14 to the deployed position.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Referring now to FIGS. 9-13 with continuing reference to FIG. 1, another example towing assembly 138 includes a tow loop 114 with laterally spaced arms 146, a bracket 142, and a biasing structure 154.

In this example, the biasing structure 154 includes a spring 88 associated with each of the arms 146. The spring 88 can be a spring clip, for example. The arms 146 are received within channels 150 of the bracket 142 as the tow loop 114 is moved to the retracted position. The springs 88 are slideably received within a respective slots 92 as the tow loop 114 moves to the retracted position. The springs 88 are configured to bias the tow loop 114 toward the deployed position.

In another example, the springs 88 are disposed on the bracket 142 and the channels 150 are formed within the tow loop 114.

Figure 13:
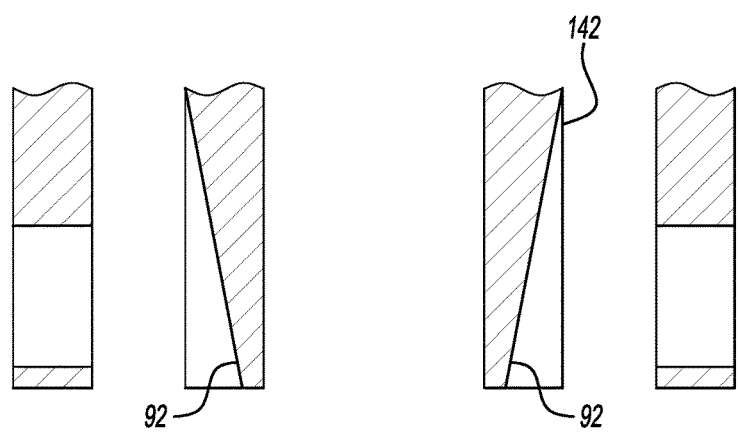
FIG. 13 illustrates a section view of a selected portion of a bracket of the tow loop system of FIGS. 9-12 showing a taper of channels in a biasing structure according to the exemplary embodiment.

As shown in FIG. 13, the slots 92 can taper laterally outward away from a lateral center of the bracket 142 such that movement of the tow loop 114 to the retracted position compresses the springs 88.

Figure 14:
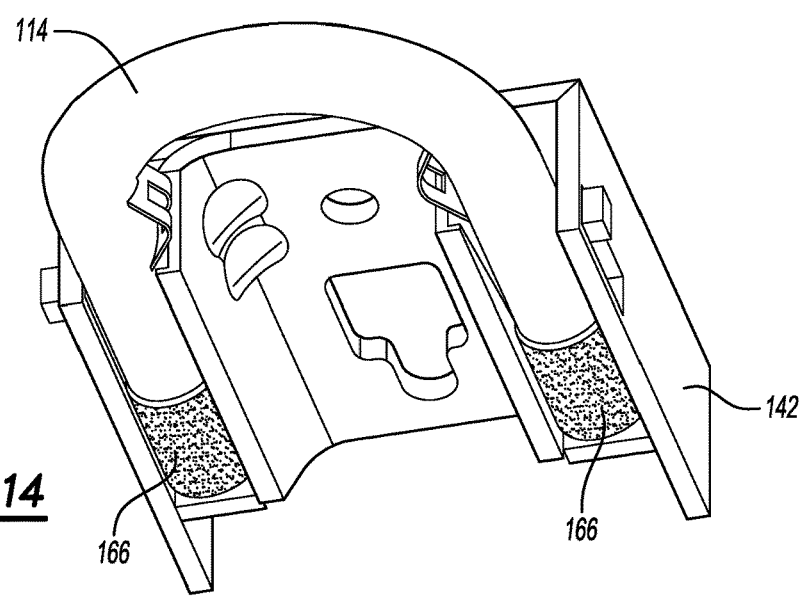
FIG. 14 illustrates a bottom view of an exemplary embodiment of the tow loop system of FIGS. 9 and 10 revealing another exemplary biasing structure.

Referring to FIG. 14, the polymer-based shock absorber 78 could be used in connection with the embodiment of FIGS. 9-13.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A towing assembly, comprising:
a bracket having laterally spaced channels; and
a tow loop having laterally spaced arms, each of the arms configured to slide within a respective one of the channels from a deployed to a retracted position in response to a load applied to the tow loop.

2. The towing assembly of claim 1, wherein the tow loop is biased away from the retracted position toward the deployed position.

3. The towing assembly of claim 2, further comprising a biasing structure configured to bias the tow loop away from the retracted position toward the deployed position.

4. The towing assembly of claim 3, wherein the biasing structure comprises a protrusion that is received within a slot as the tow loop moves from the deployed to the retracted position.

5. The towing assembly of claim 3, wherein the biasing structure comprises at least one ball bearing received within a slot on a wall of one of the channels as the tow loop moves from the deployed to the retracted position.

6. The towing assembly of claim 1, further comprising at least one polymer-based shock absorber configured to bias the tow loop toward the deployed position.

7. The towing assembly of claim 6, wherein the at least one polymer-based shock absorber includes a polymer-based shock absorber disposed within each of the channels.

8. The towing assembly of claim 3, wherein the biasing structure comprises a tension slide clip received within a groove as one of the arms is moved from the deployed to the retracted position.

9. The towing assembly of claim 8, wherein the groove is tapered such that the tension slide clip compresses as one of the arms is moved from the deployed to the retracted position.

10. The towing assembly of claim 1, wherein the tow loop has a U-shape.

11. The towing assembly of claim 1, further comprising a coupling arrangement that limits movement of the tow loop to prevent the arms from fully withdrawing from the channels such that the tow loop and the bracket remain coupled when towing a vehicle utilizing the tow loop.

12. The towing assembly of claim 11, wherein the coupling arrangement comprises an extension of one of the tow loop or the bracket received within an aperture in the other of the tow loop or the bracket.

13. The towing assembly of claim 1, wherein the tow loop is a U-bar, and further comprising a biasing structure associated with each of the arms of the U-bar, the biasing structure configured to bias the tow loop away from the retracted position toward the deployed position.

14. A method of positioning a tow loop, comprising:
in response to a load applied to a tow loop, moving the tow loop from a deployed position to a retracted position within a bracket;
biasing the tow loop away from the retracted position toward a deployed position, wherein the tow loop is a U-bar; and
biasing the tow loop away from the retracted position toward the deployed position using a biasing structure associated with each of the arms of the U-bar.

15. The method of claim 14, further comprising slideably receiving a protrusion within a channel as the tow loop slides to the retracted position.

16. The method of claim 14, further comprising biasing utilizing a polymer-based shock absorber.

17. The method of claim 16, wherein the polymer-based shock absorber is disposed within channels that receive arms of the tow loop.

18. The method of claim 14, further comprising biasing by deforming a slide clip as the tow loop moves to the retracted position.

19. The method of claim 14, further comprising biasing using at least one ball bearing received within a slot on a wall of one of the channels as the tow loop moves from the deployed to the retracted position.

* * * * *